United States Patent Office 2,755,171
Patented July 17, 1956

2,755,171
PROCESS FOR PRODUCING HYDROXYL-AMMONIUM SALTS

Lawrence R. Jones, Terre Haute, Ind., assignor to Commercial Solvents Corporation, Terre Haute, Ind., a corporation of Maryland No Drawing. Application March 8, 1955,
Serial No. 493,053

5 Claims. (Cl. 23—117)

My invention relates to a process for production of hydroxylammonium salts and more particularly it relates to a process for production of hydroxylammonium salts from alcohols derived from secondary nitro hydrocarbons.

Hydroxylammonium sulphate has been produced in the past by reaction of a primary nitroparaffin with sulphuric acid, a by-product of the reaction being a fatty acid. Such a process is described in U. S. Patent 2,323,958, issued June 29, 1943, to Phillip F. Tryon, as well as in U. S. Patents 2,113,812, 2,113,813, and 2,113,814, issued April 12, 1938, to S. B. Lippincott. All of these processes specifically mention the fact that in order to obtain hydroxylamines, which exist in the reaction product as a salt of sulphuric acid, a primary nitroparaffin must be employed in the reaction with sulphuric acid. Hydroxylamine or hydroxylammonium sulphate cannot be obtained by the action of a secondary nitroparaffin with sulphuric acid and this has caused considerable inconvenience in the industry since both primary and secondary nitroparaffins are produced in the commercial manufacture of nitroparaffins by nitration of hydrocarbons.

I have now discovered a process for producing hydroxylammonium sulphate employing secondary nitroparaffins as the ultimate raw material thus freeing the industry from reliance on primary nitroparaffins in the production of hydroxylammonium sulphate.

My new process consists essentially of reacting an alcohol derived from a secondary nitroparaffin with sulphuric acid and thereby obtaining hydroxylammonium sulphate, carbon monoxide, and a ketone, the specific nature of which depends upon the particular secondary nitroparaffin from which the starting alcohol is derived. The alcohols which I can employ in my new process have the following structural formula.

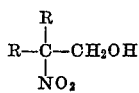

where R is alkyl. Thus I can employ in my process alcohols such as the following: 2-nitro-2-methyl-1-propanol, 2-nitro-2-methyl-1-butanol, 2-nitro-2-ethyl-1-butanol, 2-nitro-2-methyl-1-pentanol, etc. The alcohols derived from secondary nitroparaffins which I can employ in my new process can be prepared according to the process described in U. S. Patent 2,456,585, issued December 14, 1948, to H. B. Hass and J. F. Bourland. The process of this patent consists essentially of the condensation of a nitroparaffin including a secondary nitroparaffin with an aldehyde to obtain the desired alcohol. The reaction involved in my new process may be represented by the following equation:

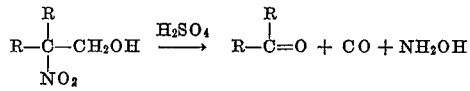

The hydroxylamine shown as a product in the above equation is, of course, in the form of the sulphate in the reaction mixture.

In carrying out my process, I merely mix the alcohol derived from the secondary nitroparaffin with sulfuric acid. However, the reaction is extremely exothermic and if large amounts of the reactants are mixed rapidly, considerable heat of reaction will be evolved, and the reaction will be extremely violent. Because of the exothermic nature of the reaction, it will be evident that means must be employed to control the heat of reaction. I prefer to carry out the reaction by incrementally adding the alcohol derived from the secondary nitroparaffin to an excess of sulphuric acid since I can thereby conveniently control the heat of reaction. Since carbon monoxide is a product of the reaction, the evolution of this gas is an accurate indicator of the completion of the reaction and in practice I can continue to add the alcohol derived from the secondary nitroparaffin until carbon monoxide ceases to be evolved upon further addition of the alcohol to the sulphuric acid.

The products of my new process can be separated from the reaction mixture by any convenient means. I prefer to separate the carbon monoxide by evolution from the reaction mixture, the ketone by distillation from a mixture of water with the remaining reaction product and the hydroxylammonium sulphate from the remaining water-free reaction product by precipitation in crystalline form following addition of a lower aliphatic alcohol thereto.

The following example is offered to illustrate my invention; however, I do not intend to be limited to the specific materials, conditions, or proportions given therein. Rather I intend to include within the scope of my invention as described in this specification and the attached claims all equivalents obvious to those skilled in the art.

Example I

To a 150-gram portion of concentrated sulphuric acid was added slowly by small increments, 30 grams of 2-nitro-2-methyl-1-propanol. The reaction temperature was held to room temperature by the slow addition of the nitro alcohol. When the nitro alcohol was added, carbon monoxide immediately started to bubble from the reaction mixture and the reaction was continued until the evolution of carbon monoxide ceased. At the completion of the reaction, the reaction mixture was poured into 750 ml. of distilled water and the mixture then distilled to obtain 16 ml. of acetone. The boiling point of the distillate was 56° C. and of the 2,4-dinitro-phenylhydrazine derivative of the distilled product 127° C. Following removal of the acetone from the reaction mixture, the remainder of the reaction mixture was concentrated to remove the water, the concentrate being then cooled and mixed with 400 ml. of anhydrous ethyl alcohol. The mixture was cooled to crystallize hydroxylammonium sulphate which was filtered and dried to obtain 13 grams of hydroxylammonium sulphate crystals. The crystals were determined to be 99.16% pure hydroxylammonium sulphate by the iron reduction method of analysis described at page 647 in Standard Methods of Chemical Analysis by Wilfred W. Scott, volume 1, fifth edition, D. Van Nostrand Company, Inc., New York (1939). Nitrogen analysis: Calculated=17.07%; Found =16.73%.

As indicated above, it will be obvious that my new process can be carried out in a continuous manner by continuously mixing the alcohol derived from a secondary nitroparaffin with sulphuric acid under conditions such as to dissipate the heat of reaction resulting from the exothermic nature of the reaction. It will also be apparent that my process can be carried out using mixtures of alcohols derived from secondary nitroparaffins in which case carbon monoxide, hydroxylammonium sulphate and a mixture ketones will be produced. Similarly, other modifications of my new process will appear to those skilled in the art and to the extent that such modifications are not excluded by the scope of the attached claims, I intend for such modifications to be included within the scope of my invention.

Now having described my invention, what I claim is:

1. The process which comprises reacting a nitro alcohol having the following formula:

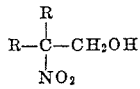

where R is alkyl, with sulphuric acid.

2. A process for the production of hydroxylammonium sulphate which comprises reacting a nitro alcohol having the following formula:

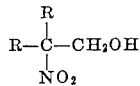

where R is alkyl, with sulphuric acid and recovering the hydroxylammonium sulphate thus produced.

3. A process for the production of hydroxylammonium sulphate, carbon monoxide, and a ketonic compound which comprises reacting a nitro alcohol having the following formula:

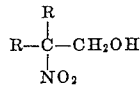

where R is alkyl, with sulphuric acid and recovering the hydroxylammonium sulphate, carbon monoxide, and ketonic compound thus produced.

4. A process for the production of hydroxylammonium sulphate which comprises slowly adding a nitro alcohol having the following formula:

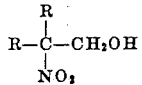

where R is alkyl, to an excess of sulphuric acid until cessation of the evolution of carbon monoxide and recovering hydroxylammonium sulphate from the reaction mixture.

5. A process for the production of hydroxylammonium sulphate, carbon monoxide, and a ketonic compound which comprises reacting a nitro alcohol having the following formula:

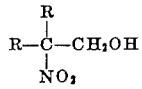

where R is alkyl, with sulphuric acid, removing the ketonic compound from the reaction mixture by distillation, and recovering hydroxylammonium sulphate from the distillation residue by removing water therefrom, and adding a lower aliphatic alcohol to the remaining solution to precipitate crystalline hydroxylammonium sulphate.

References Cited in the file of this patent

UNITED STATES PATENTS

| | | |
|---|---|---|
| 2,113,812 | Lippincott | Apr. 12, 1938 |
| 2,267,375 | Johnson | Dec. 23, 1941 |
| 2,322,958 | Tryon | June 29, 1943 |
| 2,368,072 | Tryon | Jan. 23, 1945 |

OTHER REFERENCES

Brooks, "The Chemistry of Nonbenzoid Hydrocarbons," 2d. Ed., 1950, Reinhold Publishing Company, New York, New York, pages 224–227.